US007095175B2

(12) United States Patent
Kai et al.

(10) Patent No.: US 7,095,175 B2
(45) Date of Patent: Aug. 22, 2006

(54) FOIL SEAL LAMP

(75) Inventors: Kenzo Kai, Himeji (JP); Kaoru Nakamura, Himeji (JP); Kazunori Morikawa, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/644,860

(22) Filed: Aug. 21, 2003

(65) Prior Publication Data

US 2004/0036415 A1 Feb. 26, 2004

(30) Foreign Application Priority Data

Aug. 22, 2002 (JP) .............................. 2002-242007
Jun. 17, 2003 (JP) .............................. 2003-172268

(51) Int. Cl.
*H01J 17/18* (2006.01)
*C04B 103/61* (2006.01)

(52) U.S. Cl. .................................... 313/623; 106/14.05

(58) Field of Classification Search ............. 106/14.05, 106/0.11, 0.12, 0.13, 0.14, 0.21, 286.8, 316, 106/287.35, 14.13; 313/626, 345, 332, 333, 313/326, 331, 623–625; 362/267
See application file for complete search history.

(56) References Cited

U.S. PATENT DOCUMENTS 3,052,575 A * 9/1962 Crane .......................... 148/243
3,248,251 A * 4/1966 Allen .......................... 428/559
3,396,044 A * 8/1968 Satterfield .................... 501/128
3,420,944 A 1/1969 Holcomb
3,562,023 A * 2/1971 Courier ....................... 428/341
3,726,694 A * 4/1973 Moore et al. ............... 427/212
3,793,615 A 2/1974 Homonnay et al.
3,926,761 A * 12/1975 Sera et al. .................. 204/498
3,991,337 A * 11/1976 Notelteirs ................ 174/50.61
4,385,940 A * 5/1983 Kirihara et al. ............. 148/261
4,918,353 A 4/1990 Nelson et al.
5,021,711 A 6/1991 Madden et al.
5,310,374 A 5/1994 Tomoyuki
6,204,454 B1 * 3/2001 Gotoh et al. ................ 174/255
6,218,324 B1 * 4/2001 Goettler ........................ 501/88
2002/0151635 A1 * 10/2002 Gray et al. ................. 524/439

FOREIGN PATENT DOCUMENTS

DE 30 06 846 A1 9/1980
EP 1 104 010 A1 5/2001
GB 2 045 741 A 11/1980
JP 9-12335 A 1/1997

* cited by examiner

*Primary Examiner*—Ashok Patel
*Assistant Examiner*—Christopher M. Raabe
(74) *Attorney, Agent, or Firm*—David S. Safran

(57) ABSTRACT

A foil seal lamp in which even when a high temperature of the seal area is reached oxidation of the molybdenum metal foils and the molybdenum outer leads which have been placed in the seal area can be reliably prevented, and in which a long service life can be obtained. is achieved by providing the surfaces of the metal foil and the outer lead which are placed in the seal areas with protective coatings of crystalline molybdate. An increase in the amount of protective coating that can be carried is produced by surface roughening the outer leads.

10 Claims, 6 Drawing Sheets

FOIL SEAL LAMP

BACKGROUND OF THE INVENTION

1. Field of the Invention

The invention relates to a foil seal lamp in which in the seal area a metal foil of molybdenum and an outer lead of molybdenum are installed.

2. Description of Related Art

A conventionally known foil seal lamp is described below. FIG. 1 shows a foil seal lamp of the filament lamp type with bilateral seal areas. FIG. 2 shows the seal area of the foil seal lamp as shown in FIG. 1 in an enlargement.

In the figure, a filament lamp 10 has seal areas 3 which are formed on the two ends of a glass bulb 1, and in each of which a metal foil 2 of molybdenum is installed. An outer lead 4 of molybdenum is connected to one end of the respective metal foil 2 by welding and projects from the outer end face 3A of the respective seal area 3 to the outside. On the other hand, within the bulb 1 there is a filament 5. The two ends of the filament 5 are welded via inner leads 6 to the metal foils 2 which are located on the two ends.

In the seal area 3 of such a filament lamp 10, as is shown enlarged in FIG. 2, in the vicinity of the outer lead 4, there is an extremely small cavity G which extends from the outer end face 3A of the seal area 3 to the metal foil 2.

The reason for forming this cavity G is described below. In the formation of the seal area by a pinch seal, major tensile stress does not arise in the glass because the metal foil is relatively thin. In this way, the metal foil is located directly tightly adjoining the glass. A relatively large outer lead, however, is not entirely located directly tightly adjoining the glass because, as a result of the high viscosity of the glass, the glass does not flow adequately according to the shape of the outer lead, and because the difference between the coefficients of thermal expansion between the outer lead and the glass is large. Thus, the cavity G is formed. Therefore, it is impossible, in fact, to completely eliminate the cavity G.

In such a foil seal lamp, during operation, the temperature of the seal area rises. If the metal foils and the outer leads reach a temperature of at least 350° C., rapid oxidation of the metal foils and the outer leads by the air which has penetrated into the cavity G progresses, by which $MoO_3$ is formed on the surfaces of the metal foils and the outer leads. In this way, the volume of the metal foils and the outer leads which are installed in the seal areas expands. This leads to crack formation in the seal areas. Therefore, this has resulted in cases in which the lamp was ultimately destroyed.

A lamp with a pinch seal arrangement was described above. In a discharge lamp with a vacuum shrink seal arrangement, a cavity is formed between the metal foil of molybdenum and the outer lead of molybdenum which are likewise installed in the seal area, and the glass. Therefore, the above described disadvantage has also occurred here.

Various techniques have been developed to suppress this oxidation of the metal foils of molybdenum and the outer leads of molybdenum.

Previously, U.S. Pat. No. 3,420,944 disclosed coating half of the side of the seal area end of the metal foil of molybdenum with thin chromium. In this way, the disadvantage of oxidation was eliminated to a certain extent. However, there was the disadvantage of a reduction of the strength of adhesion to the glass.

In U.S. Pat. No. 3,793,615, a new attempt was made. Here, the chromed layer was made conical or tapered. The chromium layer on the outer end in the vicinity of the weld spot of the outer lead is relatively thick, while in a metal foil which forms the hermetically sealed area it is thin. Thus, the glass-adhesive property was improved. This arrangement somewhat suppressed the oxidation of the metal foil of molybdenum.

U.S. Pat. No. 5,021,711 discloses an ion implantation process in which the metal foil is coated with Al, Cr—Al, SiC or $Si_3N_4$, besides Cr. Published German Patent Application DE 30 06 846 discloses a process in which, by sputtering, CVD, ion implantation or the like, the metal foil is coated with Ta, Nb, La, Sc, Hf or the like, besides Cr. In this process, there is the disadvantage of high production costs because coating is done beforehand, prior to sealing.

In such a process in which the metal foil and the outer lead are coated with chromium, there are the disadvantages of complicated production processes and high production costs because sealing takes place after coating of the metal foil and the outer lead with chromium.

Furthermore, recently, environmental concerns have become more critical. There is the tendency for material with high environmental burden to be limited, chromium not constituting an exception either.

The possibility that metallic chromium will change to hexavalent chromium is low. The mist which is formed by the electrolytic bath in the galvanization process and which contains hexavalent chromium is said, however, to cause lung cancer. This means that the environmental effect in the production process is regarded as a problem. Furthermore, a chromium coating which decomposes in chromous acid and chromium chloride, as was described in U.S. Pat. No. 3,420,944, due to production of hexavalent chromium is inherently environmentally harmful and therefore disadvantageous.

Japanese patent disclosure document HEI 9-12335 discloses a process in which the cavity formed in the seal area is sealed with molten sealing glass which contains 1 to 18% $Tl_2O_3$ besides 55% to 85% $Sb_2O_3$ and 5% to 30% $B_2O_3$. But since $Tl_2O_3$ is used, the effect on the environment is considered disadvantageous.

A process in which, after sealing, a sealant in the form of an aqueous solution is added to the cavity is disclosed in U.S. Pat. No. 4,918,353. In this process, an alkali metal acid salt is added to the cavity.

Japanese patent specification HEI 6-54657 also discloses a process in which, after sealing, a sealant with lead or lead oxide as the main component is produced in the cavity. However, since lead oxide is used, the effect on the environment is regarded as more and more disadvantageous.

In these processes a sealant is formed after sealing so that there is, therefore, the advantage that, compared to U.S. Pat. Nos. 3,420,944; 3,793,615; 5,021,711, and German patent 30 06 846, the production costs are relatively low.

Even when these tests were carried out, in an environment with a temperature of the seal area of greater than 400° C., oxidation of the metal foil of molybdenum and of the outer lead of molybdenum which are exposed to the cavity of the seal area could not be reliably prevented. Furthermore, there was the disadvantage that to prevent oxidation a substance must be used which has an adverse effect on the environment.

SUMMARY OF THE INVENTION

The invention was devised to fundamentally eliminate the above described disadvantages in the prior art. Thus, a first object of the invention is to devise a foil seal lamp in which, even when a high temperature of the seal area is reached, oxidation of the molybdenum metal foils and the molybdenum outer leads which have been installed in the seal area can be reliably prevented, and in which a long service life can be obtained.

A second object of the invention is to provide a foil seal lamp in which, using a material with an extremely small effect on the environment, oxidation of molybdenum metal foils and molybdenum outer leads which are installed in the seal area can be reliably prevented.

These objects are achieved in a foil seal lamp in which the ends of the glass bulb are provided with seal areas, and which comprises:

metal foils of molybdenum which are installed in these seal areas, and molybdenum outer leads with one end connected to this metal foil and the other end extending out of the bulb, in that, on the surfaces of both the metal foils and also the outer leads which are installed in the above described seal areas, protective coatings of crystalline molybdate are formed.

The objects are achieved in that, especially for the above described outer leads, the surfaces of the area which are installed in the above described seal areas are rough.

The objects are achieved in the foil seal lamp in that, especially the above described protective coatings are also formed in the areas of the outer leads which project from the seal areas.

The objects are further achieved in the foil seal lamp in that, for the above described outer leads, the surfaces of the areas which project from the seal areas are rough.

The objects are achieved in the foil seal lamp in that especially the crystal structure of the primary material of the above described protective coatings is a wolframite structure or scheelite structure. Here, the term "wolframite structure" is defined as a structure in which the crystal structure is monoclinic, and in which it has a C2/m space group. Furthermore, the term "scheelite structure" is defined as a structure in which the crystal structure is tetragonal, and in which it has an $I4_1/a$ space group.

The objects are achieved in the foil seal lamp in that the elements of the crystalline molybdate comprising the above described protective coatings are not only oxygen and molybdenum, but are chosen from one or more of the elements magnesium, calcium, strontium, barium, manganese, cobalt, nickel, titanium, scandium, yttrium, lanthanum, cerium, praseodymium, neodymium, samarium, europium, gadolinium, terbium, dysprosium, holmium, erbium, thulium, ytterbium, and lutetium.

The objects are achieved in the foil seal lamp in that, especially in the above described protective coatings the ratio of the x-ray diffraction intensity of the crystalline molybdate to the ratio of the x-ray diffraction intensity of the other produced compounds is at least 50%.

In accordance with the invention, the cavity which is formed between the molybdenum metal foil and a molybdenum outer lead and the glass in the seal area is filled with a sealant for forming the protective coatings. By the reaction of this sealant for forming the protective coatings with the molybdenum comprising the metal foils and the outer leads, protective coatings of crystalline molybdate are formed on the surfaces of the molybdenum comprising the metal foils and the outer leads.

Here, the expression "sealant for forming protective coatings" is defined as a sealant in the form of an aqueous solution which contains cations of the elements magnesium, calcium, strontium, barium, manganese, cobalt, nickel, titanium, scandium, yttrium, lanthanum, cerium, praseodymium, neodymium, samarium, europium, gadolinium, terbium, dysprosium, holmium, erbium, thulium, ytterbium, and lutetium, for example, with a nitrate. If this sealant is reacted in the form of an aqueous solution which contains cation-nitrate, or the nitrate after drying, with part of the surfaces of the molybdenum which comprises the metal foils and the outer leads, and forms a coating of crystalline molybdate, which is a protective coating which is located directly tightly adjoining the molybdenum, the anti-oxidation property of the molybdenum is increased, even if the molybdenum comprising the metal foils and the outer leads is exposed to an oxidation environment in which a high temperature of the seal area of roughly 600° C. is reached. Furthermore, if the coefficient of thermal expansion of the crystalline molybdate as the protective coatings approaches the coefficient of thermal expansion of the molybdenum comprising the metal foils and the outer leads and if a crystalline molybdate with a low degree of oxygen permeability is chosen, the molybdenum comprising the metal foils and the outer leads acquires a more advantageous anti-oxidation property.

As a result, the metal foils of molybdenum and the outer leads of molybdenum are not oxidized even if a high temperature of the seal area of roughly 600° C. is reached. Thus, advantageously hermetic sealing is produced. This yields a foil seal lamp with a long service life in which the seal areas are not damaged even during operation in such an oxidized environment with a high temperature.

Furthermore, for the outer leads, since the surfaces of the areas which are installed in the seal areas are rough, the sealant for forming the protective coatings can be easily applied to the surfaces of the outer leads. Thus, an amount of the sealant for forming the protective coatings as large as possible is carried, by which the protective coatings of the crystalline molybdate become thick, and by which the heat resistant action and anti-oxidation effect are increased.

The protective coatings of crystalline molybdate are also formed in the areas which project from the seal areas of the outer leads. During operation the outer leads reach a high temperature of greater than or equal to 500° C. and are exposed to the outside air. The outer leads which project from the seal areas are oxidized, vaporized and finally become quite thin, by which the resistance value increases, and by which Joulean heat causes a still higher temperature. If, in this way, the outer leads reach a high temperature, the heat is transferred to the outer leads and the metal foils which are installed in the seal areas, by which a state is obtained in which oxidation easily occurs. By the formation of the protective coatings in the areas which project from the seal areas of the outer leads, the areas which project from the seal areas of the outer leads are not oxidized and do not become thin either. The temperature of the outer leads in the areas which project from the seal areas therefore does not rise. The temperature of the outer leads and the metal foils which are installed in the seal areas does not rise. As a result, oxidation is prevented and damage to the seal area can be reliably prevented. Thus, a foil seal lamp with a longer service life can be obtained.

Furthermore, for the outer leads, since at least the surfaces of the areas which project from the seal areas are rough, the sealant for forming the protective coatings can be easily applied to the surfaces of the outer leads which project from these seal areas. Thus, an amount of the sealant for forming the protective coatings as large as possible is carried, by which protective coatings of the crystalline molybdate become thick, and by which the heat-resistant action and anti-oxidation action of the outer leads are increased.

The invention is described below using the embodiments shown in the drawings.

DETAILED DESCRIPTION OF THE INVENTION

Figure 1:
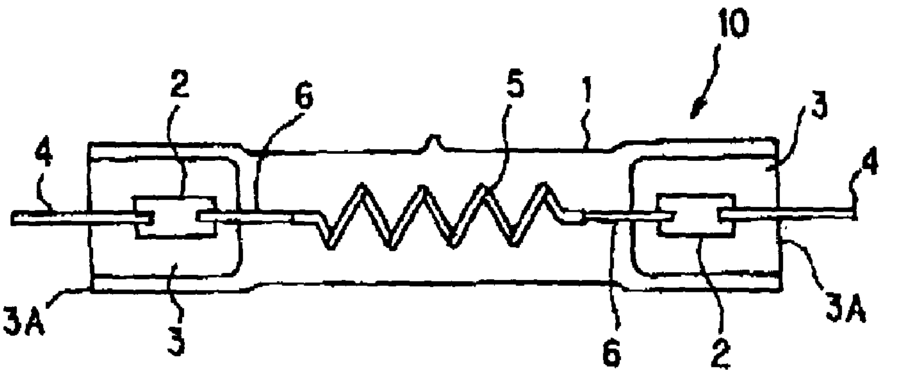
FIG. 1 shows a schematic of a foil seal lamp of the filament lamp type with hermetic terminations on both sides.
Figure 2:
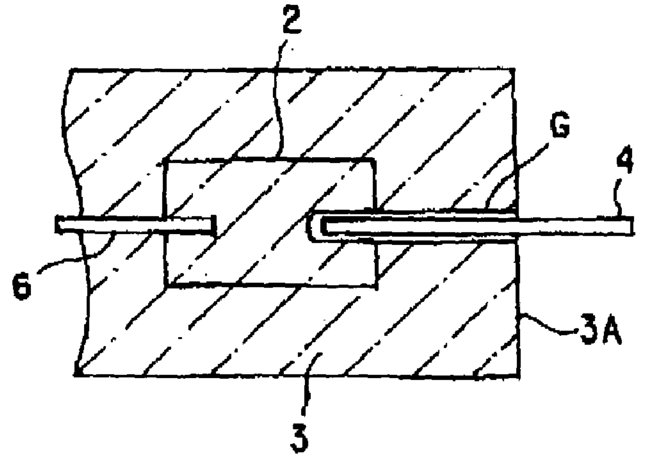
FIG. 2 shows an enlargement of the cavity of the seal area of the foil seal lamp as shown in FIG. 1.

Crystal Structure of the Protective Coating on the Molybdenum Surface

A molybdate is normally produced by burning at a high temperature after powder compression of $A_2O$, AO or $A_2O_3$ (A—monovalent, bivalent, or trivalent metal) with $MoO_3$. The inventors have confirmed from a thermodynamic standpoint that, for example, in the case in which the A ions are bivalent, the following reaction takes place even if an aqueous solution which contains A ions, or the nitrate after its drying at a high temperature is reacted directly with molybdenum:

$$Mo \rightarrow MoO_2 \rightarrow MoO_3,\ MoO_3 + A^{(+)} + 2NO_3^{(-)} \rightarrow AMoO_4 + 2NO_2(\uparrow).$$

The inventors have found that during treatment at a relatively low temperature ionous crystalline molybdate is formed when metallic Mo at a high temperature is reacted with an aqueous solution which contains A ions, or with nitrate which is formed by its drying.

By developing this principle, the inventors concluded that, by this process, the surfaces of the metal foils of molybdenum and the outer leads of molybdenum which are installed in the seal areas of the foil seal lamp can be coated with crystalline molybdate of $AMoO_4$ as protective coatings. In fact, they have confirmed, on the surface of a Mo foil, a crystalline molybdate with a crystal structure of $\alpha$-$NiMoO_4$ of a wolframite structure if $Ni(NO_3)_2$ is applied directly to the Mo foil, dried and afterwards heat treated for three minutes at 550° C. That is, by simple low temperature synthesis of drying and subsequent heat treatment, crystalline molybdate from a Ni-containing aqueous solution was produced on the Mo foil.

If this process is in fact used for a foil seal lamp and an action is exerted on the metal foil and outer lead in the cavity between the molybdenum metal foil in the seal area and the glass which is formed by the outer lead made of molybdenum, or if the outer lead which projects from the seal area is acted upon, and if, in an electric furnace, a durability test is carried out, a service life is obtained which is much longer than the service life of an untreated lamp which experiences crack formation in the seal area.

As the crystalline molybdate, one is desired with a coefficient of thermal expansion which is roughly equal to that of the molybdenum used for the metal foil and the outer lead. This is because there are lamps in which, depending on the working conditions, the lamp is used such that it is turned on or off repeatedly in a relatively short time. Therefore, at an operating temperature in the vicinity of the heat treatment temperature of the crystalline molybdate, the crystalline molybdate does not apply any stress to the molybdenum of the metal foil and the outer lead. If the coefficient of thermal expansion of the crystalline molybdate is greater than a coefficient of thermal expansion of $5.2\times10^{-6}$ (250° C.) of the molybdenum of which the metal foil and the outer lead are formed, when the lamp is turned off, a tensile stress is exerted on to the metal foil and the outer lead. If the coefficient of thermal expansion is less than $5.2\times10^{-6}$ (250° C.), a compressive stress is exerted. During operation, a stress of the reverse direction is exerted. In a lamp which is repeatedly turned on or off, in a short time, crack formation of the crystalline molybdate protective coating occurs, oxidation of the molybdenum metal foil and the outer lead progresses, by which a stress is formed in the glass of the seal area. This increases the frequency with which the glass of the seal area is destroyed. Finally, it is advantageous for the coefficient of thermal expansion of the crystalline molybdate protective coating to be as near as possible to $5.2\times10^{-6}$ (250° C.).

Based on these ideas, a crystalline molybdate was sought and a candidate found. As a result, a group of substances of molybdates with a wolframite structure and a scheelite structure was obtained with a coefficient of thermal expansion which has a value near the coefficient of thermal expansion of Mo, of which the metal foil and the outer lead are formed. Here, A is not limited to a bivalent ion, but can also be a double salt, with monovalent:trivalent of A=1:1. Furthermore, instead of Mo, a double salt can be used, with quadrivalent Ti:hexavalent Mo=1:1, and, moreover, A can be a trivalent rare earth metal.

In fact, the inventors obtained by a sintering process large crystals of this crystalline molybdate in order to measure the coefficient of thermal expansion of this crystalline molybdate. As a result of measuring the coefficient of thermal expansion, this crystalline molybdate having been formed into a narrow, rectangular parallelepiped, and having been used for measurement of the coefficient of thermal expansion, in a comparison at 250° C. of coefficient of thermal expansion for $CoMoO_4$ was $4.8\times10^{-6}$, for $MnMoO_4$ it was $4.3\times10^{-6}$, and for $NiMoO_4$ was $6.0\times10^{-6}$. For them, the coefficient of thermal expansion of Mo is likewise $5.2\times10^{-6}$ at 250° C. Therefore, all crystalline molybdates had values which are extremely near the coefficient of thermal expansion of the molybdenum comprising the metal foil and outer lead. The inventors considered them to be promising substances.

Furthermore the inventors checked the reaction generation rate, the crystal transformation and the degree of oxygen permeability of the crystalline molybdate in different ways and found even more advantageous substances.

It is necessary that there is no crystal transformation in the crystalline molybdate at less than or equal to the operating temperature of the seal area. This is because the volume above and below the transformation point changes to a large degree when there is crystal transformation and because a great stress is exerted on the crystalline molybdate; finally the glass of the seal area breaks. With consideration of this circumstance, molybdates were experimentally and theoretically studied, as will be described below.

$Mn(NO_6)_2.6H_2O$ with a solubility of 61.6 at 25° C. is dissolved in pure water and an aqueous solution is produced in which a molybdenum foil is immersed. It is removed and dried in a drying furnace, by which a cover film is formed. It is heat treated in air for five minutes at 450° C. This specimen is subjected to x-ray analysis using a thin layer x-ray diffractometer. Thus it was studied which compound is present on the surface to be treated.

Reaction Product

Figure 3:
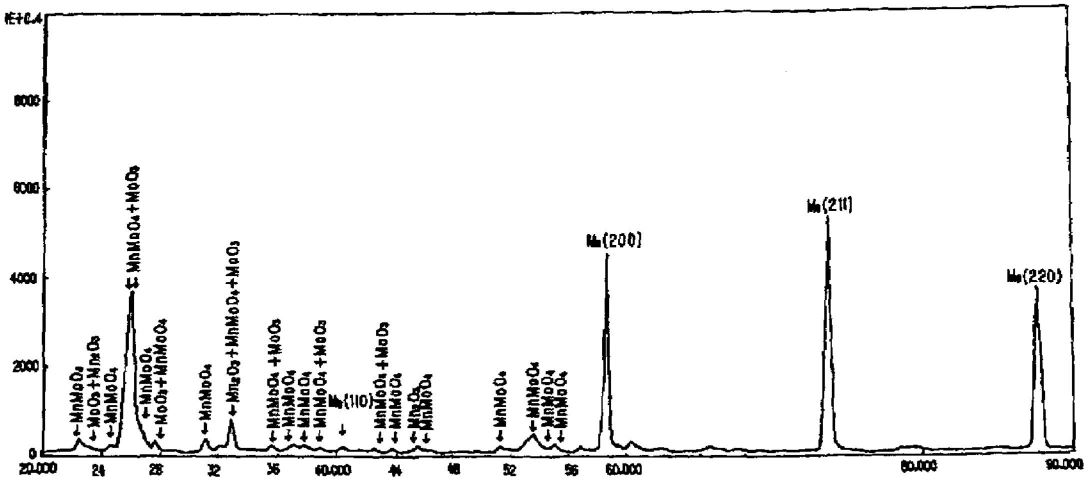
FIG. 3 is a sample representation of an x-ray diffraction plot which shows the structure of the crystalline molybdate ($MnMoO_4$) which is formed on the surface of the molybdenum foil.

FIG. 3 shows an x-ray diffraction pattern of the specimens in which the molybdenum foils were subjected to the above described treatment. It was found that $MnMoO_4$ with a wolframite structure (monoclinic, space group C2/m) is the main product. The other small amounts of compounds also agreed with $MoO_3$ and $Mn_2O_3$ when they were identified with the ASTM (American Society for Testing Materials) card. The ratio of the strongest peak intensity of the compounds relative to one another for $MnMoO_4$:$Mn_2O_3$:$MoO_3$=80:10:10. Since $MoO_3$ is the sum of the reaction product of the Mo of the metal foil oxidized with the oxygen in the air during heat treatment, this is not desirable with respect to anti-oxidation coating. If $MoO_3$ which was heat treated for five minutes at 450° C. is compared to $MoO_3$ which was heat treated for five minutes at 550° C., the ratio of the peak value of $MoO_3$ to the peak value of Mo of the metal foil for the latter $MoO_3$ becomes 15 times greater than for the former $MoO_3$. It was also found that the oxidation action of the molybdenum metal foil progresses more than the production of $MnMoO_4$. Furthermore, since it can be assumed that $Mn_2O_3$ also allows oxygen to pass, it was assessed whether $MnMoO_4$ as the main product for an anti-oxidation property can be an advantageous coating. Based on these results, research continued and it was found that the degree of production of $MnMoO_4$ differs depending on the conditions of the heat treatment. Thus, the heat treatment conditions were ascertained under which crystalline molybdate exhibits the highest degree of production.

As a result of a service life test in an electric furnace in air, it was found that a seal area which is matched to the lamp and which was heat treated under the condition under which the degree of production of $MnMoO_4$ is great has the longest service life up to the occurrence of a rainbow by Newtonian rings. Furthermore, it was found that, in the lamp seal area which was produced under the condition under which the degree of production of $MnMoO_4$ at the the x-ray intensity is less than 50%, a lengthening of the service life cannot be expected. Therefore, it was found that $MnMoO_4$ is a compound which preserves the anti-oxidation property.

Figure 4:
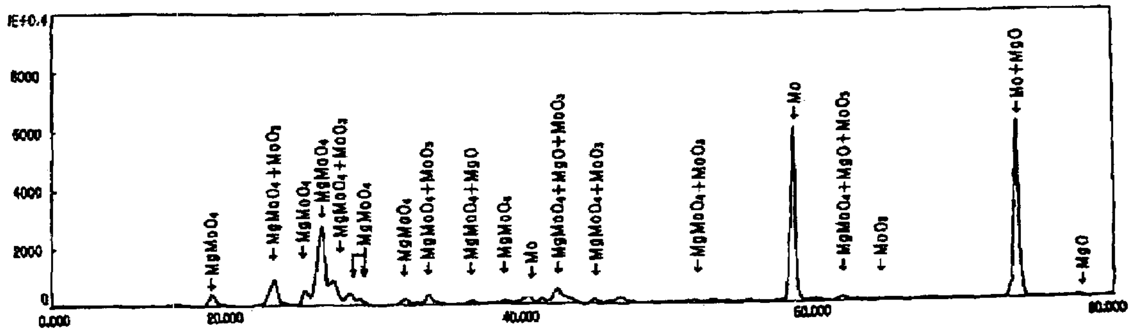
FIG. 4 is a sample representation of an x-ray diffraction plot which shows the structure of the crystalline molybdate ($MgMoO_4$) which is formed on the surface of the molybdenum foil.

Using an aqueous solution in which $Co(NO_3)_2/6H_2O$ and $Mg(NO_3)_2/6H_2O$ with respective solubility at 25° C. of 50.7 and 42.1 was dissolved, a crystalline molybdate has been produced on the surface of the molybdenum foil, from which it was confirmed that $CoMoO_4$ and $MgMoO_4$, which likewise have a wolframite structure (monoclinic, space group C2/m), is produced as the primary material. Furthermore, for an aqueous solution with a solubility of 44.1 which contains $Sr(NO_3)_2$, $SrMoO_4$ with a scheelite structure (tetragonal, space group $I4_1/a$) was produced. FIG. 4 shows a schematic of an x-ray diffraction pattern in the case of $MgMoO_4$.

Most nitrates, as was described above, have a high solubility in an aqueous solution. A coating of crystalline molybdate with good adhesion can be easily produced from this aqueous solution on the surface of the molybdenum.

Furthermore, it was also easily confirmed that, for a small sample of at most 1 mm, the above described crystalline molybdate with a maximum peak intensity ratio of at least 70% was produced when, after use for a lamp, the seal area was destroyed, the molybdenum metal foil and the molybdenum outer lead were removed and using a super high intensity x-ray source of the rotary anode type, x-ray analysis was performed.

In the ASTM card, a structure was reported in which, for example, in the system of $MgMoO_4$, the $MgMoO_4$ structure is hydrated, such as $MgMoO_4/nH_2O$ (n=0.55 to 12). In a process in which the sealant was subjected to heat treatment and was reacted with molybdenum, no hydrated structure was determined. In crystalline molybdates based on Co, Mn and Ni, in no case was a hydrated structure determined. Therefore, the feature of a stable crystal structure is obtained which is not influenced by moisture.

Coefficient of Thermal Expansion, Lattice Constant and Crystal Transformation

A crystalline molybdate with good adhesion can be easily produced on a molybdenum surface. As was described above, however, it is desirable for the crystalline molybdate to have a coefficient of thermal expansion which is equal to the coefficient of thermal expansion of the molybdenum of which the metal foil and outer lead are made. It is advantageous for the coefficient of thermal expansion to be as near as possible to the coefficient of thermal expansion of $5.2\times10^{-6}$ of the molybdenum of the metal foil and the outer lead.

Furthermore, it is necessary that there is no crystal transformation in the crystalline molybdate at less than or equal to the operating temperature of the seal area. This is because the volume above and below the transformation point changes extensively when there is crystal transformation and because a great stress is applied to the crystalline molybdate, so that, finally, the glass of the seal area breaks. With consideration of this circumstance, molybdates were experimentally and theoretically studied.

In $AMoO_4$ with a scheelite structure, there are many cases in which the coefficient of thermal expansion, in the case in which A is one of the elements Sr, Ca or Ba, is greater than $10\times10^{-6}$. Conversely, using publications and by taking a measurement of the coefficient of thermal expansion of a bar which was obtained in practice by using an oxide raw material and by a sintering process, it was confirmed that in $AMoO_4$ with a wolframite structure (monoclinic, space group C2/m), the coefficient of thermal expansion in the case in which A=Mg, Mn, Co or Ni is $4\times10^{-6}$ to $6.2\times10^{-6}$. This means that crystalline molybdates were obtained with coefficients of thermal expansion which are in fact near the coefficient of thermal expansion of the molybdenum comprising the metal foil and outer lead.

It is pointed out that the values of these coefficients of thermal expansion are smaller than those of crystalline molybdates with the scheelite structure which $AMoO_4$ likewise have, and in which A=Sr, Ca or Ba. It can be assumed that there is a positive correlation between the size of the lattice constant and the size of the coefficient of thermal expansion.

However, thermoanalysis has confirmed that in crystalline molybdates from $AMoO_4$, in the case in which A=Co, Ni, there are crystal transformations. Crystal transformation is at 400° C. in $CoMoO_4$ and in $NiMoO_4$ it is at 680° C. Here, the volume changes above and below the transformation point. Therefore, $CoMoO_4$ cannot be used for the protective coatings of the invention. But, it is pointed out that $CoMoO_4$ can be used at a temperature of at most 550° C. when a quasi-binary system, such as $(Co_{0.04}Ni_{0.06})MoO_4$, is used and if the transformation temperature is raised.

Conversely, in $AMoO_4$, if A=Mn, Mg, the coefficient of thermal expansion is near that of the molybdenum of the metal foil and the outer lead. Furthermore, there is no crystal transformation. Thus, an optimum protective coating of a crystalline molybdate can be obtained.

Furthermore, the lattice constant of a crystalline molybdate with a scheelite structure in which, for $A(Mo_{1-x}Ti_x)O_4$, a choice is made from one of Sc, Y, La, Ce, Pr, Sm, Gd, Th, Dy, Ho, Er, Tm, Yb and Lu, is less than the lattice constant of a crystalline molybdate, likewise, with the scheelite structure in the case in which A=Sr, Ca, Ba. It can therefore be assumed that, here, the coefficient of thermal expansion is roughly as small as in the case in which $AMoO_4$, A=Mg, Mn, Co, Ni.

As is described below, the reason why the $MgMoO_4$ system exhibits an especially good high temperature anti-oxidation property is that:

- the coefficient of thermal expansion is near that of the molybdenum comprising the metal foil and the outer lead;
- a stable coating is formed without the crystal structure being influenced by the temperature, moisture content and the like;
- $MgMoO_4$ allows oxygen to pass poorly, as is shown below in <oxygen permeability> and
- the degree of production of $MoO_3$ is low, as is also apparent from the result of x-ray diffraction.

Oxygen Permeability

Since a coating is formed on the surface of the molybdenum of the metal foil and the outer lead as a protective coating by a crystalline molybdate adheres strongly, and does not easily loosen even upon repeated exposure to a thermal stress, in the high temperature oxygen environment of the lamp seal area, an anti-oxidation effect is obtained. The lamp is thus protected against destruction of the seal area.

However, since there is the molybdenum of the metal foil and the outer lead under this coating, the molybdenum under the coating oxidizes rather quickly when the oxygen permeability of the coating is large. In this way, $MoO_2$ and $MoO_3$ are formed. The coating must fail comparatively quickly.

Therefore, a crystalline molybdate with low oxygen permeability of the coating is desired. Mn, Co, and Ni are transition metals with an electron structure which is interchangeable depending on the crystal structure and the atomic configuration, i.e., it becomes bivalent or trivalent. There is the tendency for the oxygen permeability of a crystalline molybdate which chooses these metals as the mutual elements to be great. This means that when oxygen has passed through, specifically the cations of the latter according to the amount of oxygen as anions in the vicinity can change the number of their value. Conversely since alkali earth metals, Zn, Cd and the rare earth metals can each be either only bivalent or trivalent, and otherwise can never assume another value, the electron state cannot be changed depending on the number of oxygen ions in the vicinity of the cations. The structure in the vicinity of the cations therefore cannot be free. The diffusion rate of the oxygen is therefore low. Or it can be maintained that the structure of the crystalline molybdate is stabilized such that the number of the value cannot be flexibly changed according to the amount of oxygen in the vicinity.

In the x-ray diffraction pattern shown in FIG. 3, 2θ=58.60°, 73.68° each show the peak value of Mo, therefore, the diffraction line proceeding from the molybdenum foil under the coating. The intensity of this peak value depends on the thickness of the crystalline molybdate as the coating which adheres overhead and is moreover greatly influenced by the degree of oxidation of the molybdenum. The following has become clear.

Even if the thickness of the crystalline molybdate is constant, this peak intensity decreases as the oxidation of the molybdenum progresses; this is a good scale which is correlative to the degree of oxidation. Furthermore, the following was found:

In fact, the diffraction peak of Mo decreases rather quickly if, in the case of a crystalline molybdate based on Mn, Co, Ni as transition metals, a coated substrate is subjected to a high temperature. In the case of a $MgMoO_4$ coating, on the other hand, the peak intensity does not decrease at a high temperature for a rather long time.

The reason for the high diffusion rate of oxygen and of the high oxygen permeability of the crystalline molybdate which contains Mn, Co and Ni systems is presumably that the Mn, Co, Ni systems are multivalent metals. As a result, it is assumed that a protective coating of a crystalline molybdate which contains alkali earth metals, Zn, Cd, and a protective coating of a crystalline molybdate which contains rare earth metals have an outstanding anti-oxidation action at a high temperature.

As is described above, the reason why the $MgMoO_4$ system has an especially outstanding anti-oxidation property at a high temperature is the following:

- the coefficient of thermal expansion is near that of the molybdenum comprising the metal foil and the outer lead;
- a stable coating is formed without the crystal structure being influenced by the temperature, moisture content and the like;
- $MgMoO_4$ poorly allows oxygen to pass, as was described above and
- the degree of generation of $MoO_3$ is low, as is also apparent from the result of x-ray diffraction.

Polishing Treatment of the Outer Lead

Next the condition was studied under which molybdenum nitrate which becomes a crystalline molybdate is easily applied to the outer lead of molybdenum and as much as possible is carried by it in a large amount.

In order to apply an aqueous solution (essentially water) to a metallic surface, it is necessary to clean the metallic surface. One of the processes for obtaining such a cleaned surface is that the surface is cleaned with an acid solution, or the surface is heat treated in a hydrogen-air flow. Immediately after formation of the cleaned surface, the contact angle is 0, its easily becoming wet from water. However, if it is allowed to lie in the air, the value of the contact angle increases until it finally no longer becomes wet. If there is a vapor of an organic material present, the hydrophobic tendency is rather great.

As a process for obtaining a surface which becomes easily wet from water, there is a polishing process. If electrolytic polishing is carried out, the contact angle of the outer lead of molybdenum reaches 0 with respect to water. The Mo foil which is used for foil sealing of the lamp, has already undergone electrolytic polishing in order to be shaped like a wing. However, the outer lead is normally subjected to acid treatment of a drawn part of oxygen-furnace treatment and afterwards used for mounting. Therefore, it happens that water (sealant) is easily applied to the Mo foil in the cavity of the seal area after foil sealing, but is applied to the outer lead with difficulty. It was therefore feared that, with respect to the heat resistant and anti-oxidative service life of the lamp, crack formation of the silica glass would occur prematurely.

It was found by service life tests of the seal areas of several lamps that the failure of the silica glass begins roughly distributed at two locations. There are especially the following cases:

case in which in the vicinity of the welding spot of the molybdenum metal foil cracks form on the outer lead which consists of molybdenum; and case in which cracks form in the vicinity of the outer face of the seal area in which the outer lead tries to project from the cavity of the seal area.

The immediate vicinity of the welding spot keeps the heat-resistant and anti-oxidative performance by the protective coating from a crystalline molybdate in a sufficient amount. The latter case in which cracks of the outer end face of the seal area are formed prematurely, was regarded as disadvantageous. It was found that the reason for this is the following:

In the area in which the outer lead projects from the outer end face of the seal area the protective coating of a crystalline molybdate is thin or not present. Here, oxidation progresses prematurely. In the outer lead, $MoO_3$ accumulates which, as a result of cubic expansion, comes into contact with the glass of the seal area, by which tensile stress is formed. It was necessary for the outer lead to be coated more thickly with the protective coating of crystalline molybdate.

Therefore, the outer lead was subjected to electrolytic polishing. The condition for this was the following:

1N aqueous solution of caustic soda

5 $mA/mm^2$ to 10 $mA/mm^2$ current density; and 60 s to 120 s duration.

In order to measure the effect of electrolytic polishing, the outer lead was dipped in a sealant (also called the sealant for forming the protective coating), dried and its weight, i.e., the carried amount, determined with an analytic balance. The weight in the case of polishing was $32\times10^{-6}$ $g/mm^2$, and without polishing $5\times10^{-6}$ $g/mm^2$. Therefore, a carried amount almost six times as great was obtained. In this way, electrolytic polishing has the advantage that, not only the surface of the molybdenum outer lead can be easily wetted with water, but a large amount of aqueous solution can be carried. The reason for this is that the surface is provided with roughness, that on the concave-convex parts of the surface, the aqueous solution remains suspended in a large amount and does not simply slip away. Therefore, when it is dried, a large amount of coating material is carried by the surface.

To determine the condition of electrolytic polishing under which the largest amount of sealant is carried by the outer lead, the voltage and the polishing time (length of treatment) were changed and the relation between the surface roughness and the carried amount of the sealant which corresponds to this condition was studied. The carried amount of sealant was measured using a balance for analysis with accuracy of 10 μg.

Figure 5:
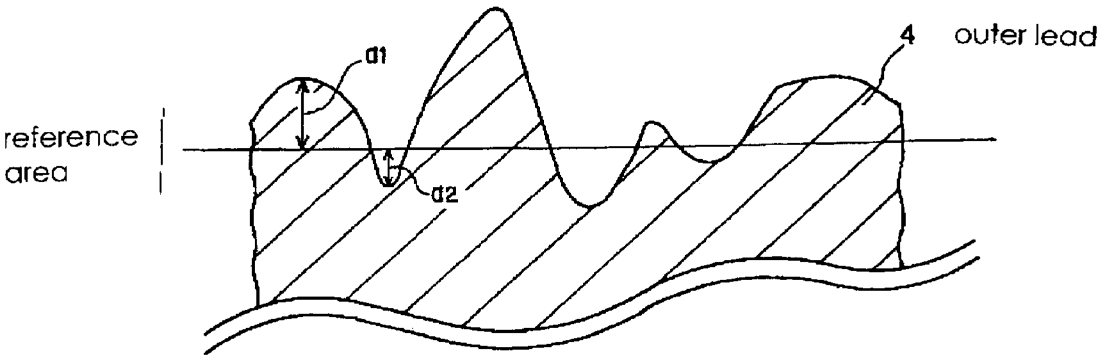
FIG. 5 shows a schematic of the definition for measurement of the roughness of the surface of the outer lead.

Here, the expression "surface roughness" is defined as one which was measured using the function of the surface form measurement of a laser microscope. As is shown in FIG. 5, the average distance (unit: μm) of the vertical difference (in FIG. 5, distance a1, a2, . . . μm) of the surface of the outer leads which was measured in an area L of the outer lead with respect to any reference surface in the vertical direction (Z direction) is defined as the surface roughness.

Table 1 lists the measured values which show the relation between the surface roughness and the carried amount by electrolytic polishing. The surface roughness of the outer lead changes depending on the relation between the voltage applied to the outer lead and the length of treatment. As is shown in Table 1, the surface roughness increases when the voltage is kept constant and the length of treatment is prolonged. However, if the length of treatment is kept constant and the voltage increased, there is the tendency for the surface roughness to increase in the outer leads of the sample nos. 1, 2, 3 with a short treatment time. But, if the length of treatment is 60 seconds and 120 seconds, i.e., when it becomes longer, in the case of a change of the voltage from 1 V to 2 V and to 3 V, the surface roughness in the middle case, i.e., at 2 V, is maximally large. Conversely, the surface roughness is reduced when the voltage increases to 3 V.

It can be imagined that the reason for this is that, when the treatment length (length of polishing) is increased as a result of controlling the tendency for the surface roughness together with the voltage to increase, against the tendency for the angle of the contour together with the voltage to be rounded and become smooth, the surface roughness at a voltage of 3 V becomes rather smaller than at a voltage of 2 V. This means that, within a certain range of a certain length of treatment and a certain voltage, the surface of the outer lead becomes coarse. However, if this range is exceeded, the surface of the outer lead conversely becomes smooth, from which a high gloss polish arises.

This means that if the length of treatment and the voltage are changed, the surface roughness of the outer lead can be controlled. As becomes apparent from Table 1, at surface roughnesses of 0.16 μm and 0.15 μm, the amount of sealant carried is less than or equal to 15 $\mu g/mm^2$, by which the amount of sealant which is carried by the outer lead becomes less. As a result, the protective coating of the finished crystalline molybdate becomes thin and its thermal resistance and anti-oxidation property are degraded. On the other hand, the amount of sealant carried at a surface roughness of 0.51 μm is 32 $\mu g/mm^2$, by which the protective coating acquires outstanding heat resistance and an outstanding antioxidation property.

As a result, the amount of sealant retained by the outer lead becomes optimum if the surface roughness of the outer lead is in the range from 0.20 μm to 0.51 μm. Thus, an outer lead can be obtained which has heat resistance due to the finished protective coating of a crystalline molybdate, and its surface is not oxidized.

Furthermore, it can also be imagined that it is also possible for a surface roughness of the outer lead of at least 0.51 μm to be achieved by changing the length of treatment and the voltage. The shape of the outer lead which is used for a foil seal lamp as in the invention however falls into the condition of a certain range. Control of the length of treatment and the voltage such that the surface roughness of the outer lead reaches 0.51 μm is rather difficult in electrolytic polishing technology. In the invention, it is established such that a range of the surface roughness of the outer lead from 0.20 μm to 0.51 μm is optimum.

TABLE 1

| Sample | Polishing condition | | Surface roughness | Amont carried |
|---|---|---|---|---|
| Number | V | Seconds | μm | μg/mm$^2$ |
| 1 | 1 | 6 | 0.15 | 10 |
| 2 | 2 | 6 | 0.16 | 13 |
| 3 | 3 | 6 | 0.20 | 15 |
| 4 | 1 | 60 | 0.20 | 15 |
| 5 | 2 | 60 | 0.44 | 29 |
| 6 | 3 | 60 | 0.28 | 20 |
| 7 | 1 | 120 | 0.22 | 16 |
| 8 | 2 | 120 | 0.51 | 32 |
| 9 | 3 | 120 | 0.31 | 22 |
| 10 | untreated | | 0.057 | 5 |

Furthermore, for the outer lead, it is effective to add a sealant with a high concentration. If a sealant as an aqueous solution which has been dissolved up to solubility is used, a coating with a normal layer thickness is possible.

For polishing in which the surface is provided with roughness, there is not only electrolytic polishing, but also different processes. Mechanical polishing by means of a rotary brush or the like or chemical polishing in a solution of hydrogen peroxide can also be done.

Figure 6:
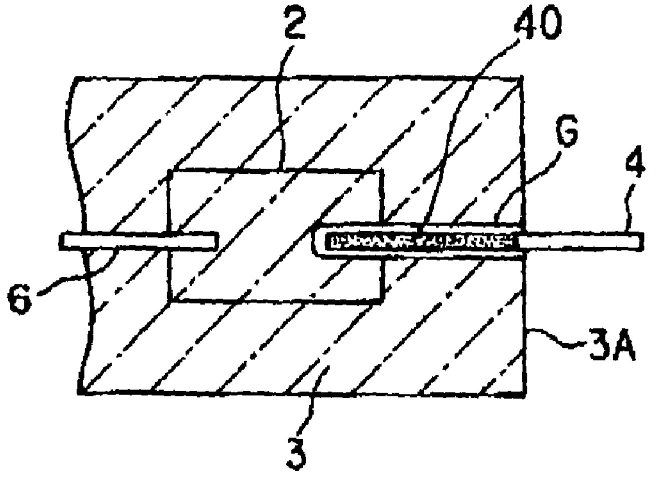
FIG. 6 illustrates the state in which the surface of the outer lead which is installed in the seal area in the invention is formed to be rough.
Figure 7:
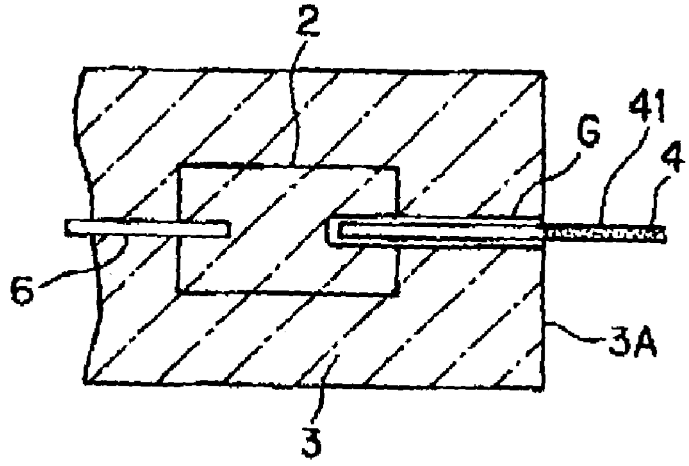
FIG. 7 illustrates the state in which the surface of the outer lead which projects from the seal area in the invention is formed to be rough.

The site at which a molybdenum outer lead which is provided with a surface roughness in the range from 0.20 μm to 0.51 μm is shown in FIG. 6 with a reference number 40, i.e., it is the surface of the area which is installed in the seal area 3. Or it is shown in FIG. 7 with reference number 41, i.e., it is the surface of the area which projects from the seal area 3. Moreover, the entire surface of the outer lead can be provided with a surface roughness in the range from 0.20 μm to 0.51 μm. As a result, the protective coating of the crystalline molybdate becomes thick, by which weakening of the outer lead at a high temperature can be prevented even more effectively.

Figure 8:
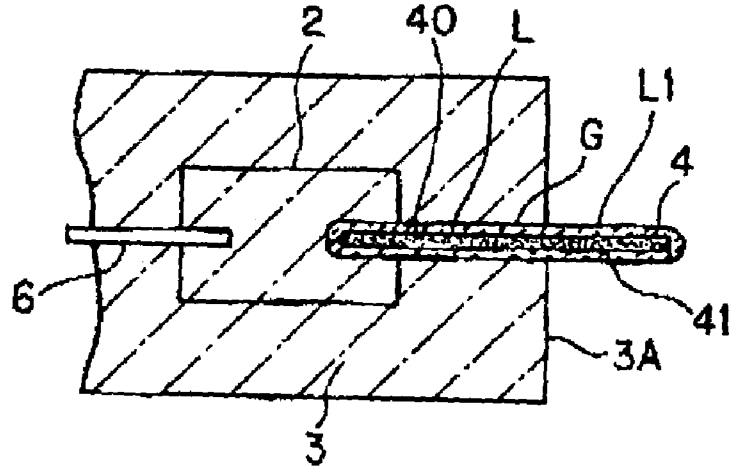
FIG. 8 illustrates the state in which on the surface of the outer lead which projects from the seal area in the invention a protective coating of crystalline molybdate is formed.

The area in which a protective coating L of a crystalline molybdate is formed, as is shown in FIG. 8, can furthermore be formed in the area L1 of the outer lead 4 which projects from the seal area 3. In this case, the outer lead 4 which projects from the seal area 3 projects into the oxygen-containing atmosphere. On the surface of the outer lead 4, a protective coating L1 of crystalline molybdate is formed. Therefore, the outer lead 4 is neither oxidized nor vaporized. Thus, it does not become thin, so that damage to the seal area can be prevented with certainty.

Embodiments

The outer shape of the foil seal lamp is identical to that of the filament lamp described in the prior art. The feature of the invention is described using FIG. 9.

Figure 9:
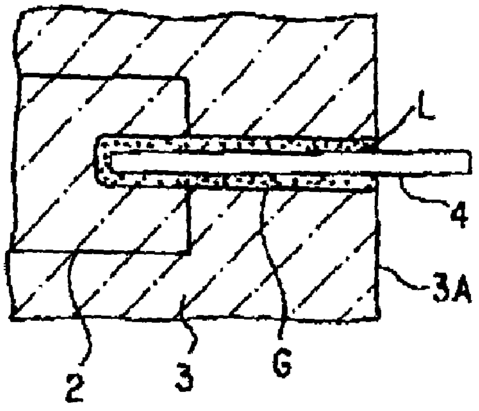
FIG. 9 shows a foil seal lamp in accordance with the invention in which the cavity of the seal area is filled with a sealant which is used to form the protective coating of crystalline molybdate.

As is shown in FIG. 9, in the vicinity of the molybdenum outer lead 4, there is an extremely small cavity G which extends from the outer end face 3A of the seal area 3 to the molybdenum metal foil 2. The outer lead 4 projects from the seal area 3 to the outside.

If a sealant L (also called a "sealant for forming a protective coating L") which is formed of an aqueous solution of a nitrate with element/elements chosen from one or more of the elements magnesium, calcium, strontium, barium, manganese, cobalt, nickel, titanium, scandium, yttrium, lanthanum, cerium, praseodymium, neodymium, samarium, europium, gadolinium, terbium, dysprosium, holmium, erbium, thulium, ytterbium, and lutetium is allowed to drip in a suitable amount by a suitable injection means into the outer periphery of the outer lead 4 on the outer end face 3A of the seal area 3, the sealant for forming the protective coating L penetrates from the opening into the cavity G.

Since, for the outer lead 4, a component is used which is subjected beforehand to electrolytic polishing, such that the surface roughness is in the range from 0.20 μm to 0.51 μm, using an injection device, the sealant L is allowed to drip within the cavity G. However, the sealant can also be allowed to drip onto the surface of the outer lead which projects from the seal area by means of an injection device or the seal area can be immersed directly in the solution of the sealant L and afterwards removed.

In the case of immersion of the seal area, it is more successful with respect to high temperature anti-oxidation if the concentration of the sealant L which is carried by the outer lead which projects from the seal area is as much as possible higher than the concentration of the drops into the cavity, i.e., if the concentration is the concentration which has been dissolved up to maximum solubility. The reason for this is the following.

For the concentration of the drops into the cavity G, depending on the size of the cavity G of the lamp, there is a concentration which is suitable for the anti-oxidation property. However, in the area which projects to the outside, there is no limitation of coating thickness.

Since this sealant for forming the protective coating L has a low viscosity and good flow property, it flows extremely smoothly into the cavity G, and moreover, effectively wets the molybdenum metal foil and the molybdenum outer lead as well as the glass. Therefore, the inside of the cavity G can be filled without the need to use a special agent.

The nitrate which is formed of the above described element/elements, in all cases, has a rather high water solubility. That of $Pr(NO_3)_3/6H_2O$ is 10.0 and is low. But in all other cases, it is in the range from 40 to 60. By its use, there is the advantage that the protective coating of crystalline molybdate can be made relatively thick to the extent to which the anti-oxidation property is maintained.

A protective coating of crystalline molybdate is formed on the surfaces of the molybdenum metal foil and the molybdenum outer lead in the manner described below:

The sealant for forming the protective coatings L which was injected in the above described manner into the cavity G of the seal area 3 is dried;

Afterwards the seal area is heated in air, for example, to 500° C.

In this way, the sealant for forming the protective coatings L is subjected to thermal decomposition, and at the same time, is reacted with the molybdenum metal foil and the molybdenum outer lead.

Furthermore, the salt from the above described element/elements is not limited to nitrate. It goes without saying that chloride, bromide, iodide, carbonate, sulfate, phosphate or the like can also be used if it can be dissolved in water. Nor is the solvent limited to water, but can also be, for example, mixed with alcohol. In this way, the flow property of the sealant for forming the protective coatings L is increased, or the property that it wets glass and molybdenum is improved. Thus there are also cases in which it becomes possible to allow it to flow more smoothly into the cavity.

It is advantageous to use a solution with a concentration of at least 0.4 mol/l including a saturated aqueous solution as such a sealant for forming the protective coatings L. At less than or equal to 0.4 mol/l, the thickness of the protective coating is reduced, by which the objective can only be rarely reached. Furthermore, it was found that, in a lamp which was produced under the condition under which the degree of production of $MgMoO_4$, at the x-ray intensity, is less than 50%, there is the danger that no prolongation of the service life can be expected.

The invention was described above using the example of a filament lamp with bilateral seal areas. However, the invention can be used for any foil seal lamp if, in the latter, a molybdenum metal foil and a molybdenum outer lead are sealed in the seal area.

Figure 10:
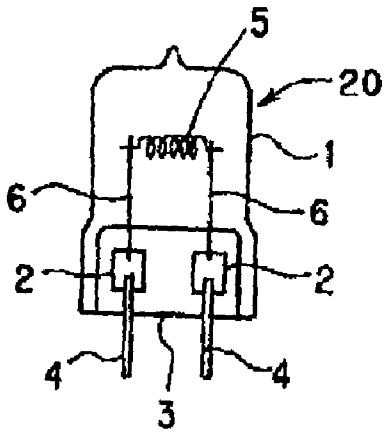
FIG. 10 shows a schematic of a foil seal lamp of the filament lamp type with a one-sided hermetic termination for which the invention is used.
Figure 11:
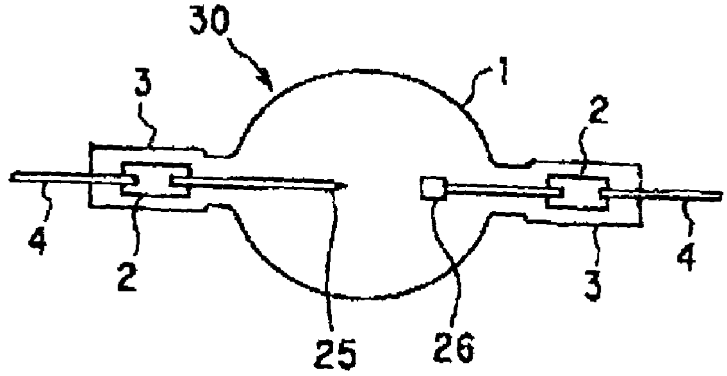
FIG. 11 shows a schematic of a foil seal lamp of the discharge lamp type with two-sided hermetic terminations for which the invention is used.

For example, as is shown in FIG. 10, in a lamp 20 with a termination on only one side (single end lamp) with a bulb 1 in which molybdenum outer leads are welded to two molybdenum metal foils 2 and are inserted in a seal area 3, or, as is shown in FIG. 11, in a discharge lamp 30 in which, by connecting the discharge electrodes 25, 26 to the molybdenum metal foils 2, there is a spherical bulb 1, and in which molybdenum outer leads 4 are connected to the metal foils 2, the invention can be used entirely in the same manner for the seal area, and thus, the service life of the lamp can be prolonged.

EXPERIMENTAL EXAMPLE 1

An embodiment of the invention is described below.

A tungsten-halogen lamp of the double end type is produced in which there are seal areas on both sides of a silica glass bulb, as is shown in FIG. 1.

In the example which is shown in FIG. 9 and which corresponds to claim 1, an aqueous $Mn(NO_3)_2$ solution, as the sealant for forming the protective coatings, was allowed to drip into the cavity which is present on the outer end face of the seal area. The sealant for forming the protective coatings penetrated the cavity between the silica glass and the molybdenum outer lead and traveled to the outer end of the molybdenum metal foil.

It appears that this sealant for forming the protective coatings fills the cavity and that the metal foil and the outer lead becomes wet. Such a lamp is placed in a drying furnace and dried. The lamp, after drying in an electric furnace, was heat treated to form a protective coating of crystalline molybdate on the surfaces of the molybdenum metal foil and the molybdenum outer lead. In the same way, an aqueous $Mg(NO_3)_2$ solution, an aqueous $Sr(NO_3)_2$ solution and an aqueous $(NiMn)(NO_3)_2$ solution were produced, the cavity formed in the seal area of the lamp was filled with it as the sealant for forming the protective coatings and afterwards drying was performed. The lamp was heat-treated in an electric furnace under suitable heat treatment conditions. Thus, a protective coating of crystalline molybdate was formed on the surfaces of the molybdenum metal foil and the molybdenum outer lead. For service life testing of these lamps, a process was not used in which the lamps are operated, and instead, the lamps were placed in an electric furnace and the running time until crack formation in the seal area was observed.

Such a service life test in which the lamps are not operated acts as a simple, practical and reliable manner of assessing under what condition the service life is longest when the conditions of the protective coating are changed. It also corresponds to the service life test in which the lamps are operated in practice with respect to the determination as to those conditions for which the service life is long or short. Two different tests A and B were run.

Test A is a test which is carried out as follows with the processes described below being repeated:

The lamps are placed in an electric furnace and heated so that the temperature of the seal area reaches 500° C. and is held at that temperature for six hours without interruption;

Afterwards, the lamps are removed from the electric furnace and observed for 30 minutes; and Then, the lamps are returned to the electric furnace and heated for six hours without interruption.

Test B is a test which is run as follows with the processes described below being repeated:

The lamps are placed in an electric furnace so that the temperature of the seal area reaches 500° C. and is held at that temperature for 24 hours without interruption;

Afterwards, the lamps are removed from the electric furnace and observed for 30 minutes; and Then, the lamps are returned to the electric furnace and heated for 24 hours without interruption.

Each time the lamps are inserted into the electric furnace and removed from it a stress is exerted on the seal area. Therefore, frequency becomes one of the rate control conditions under which oxidation is continued.

Foil seal lamps with a rated wattage of 650 W were used for the tests; there are seal areas on their opposite ends. Table 2 shows the results.

As is shown in Table 2, in the lamp for comparison purposes without a protective coating of crystalline molybdate, in test A, after 30 hours, and in test B, after 110 hours, cracks formed in the seal area. It becomes apparent that, on the other hand, in the lamps in accordance with the invention with a crystalline molybdate protective coating, in both test A and test B, the time to formation of cracks was obviously longer as compared to the lamp for comparison purposes, and that the service life was prolonged in the lamps of the invention.

Especially in a lamp with a protective coating of crystalline molybdate of $MgMoO_4$, the time until formation of cracks is at least 1100 hours. Therefore, the service life is extremely long and oxidation of the molybdenum metal foil which is installed in the seal area and of the molybdenum outer lead can be prevented most advantageously.

TABLE 2

| Type of Lamp | Type of protective coating | Test A Time until cracks form (hours) | Test B Time until cracks form (hours) |
|---|---|---|---|
| Lamp as claimed in the invention | $MnMoO_4$ | 120 | 330 |
| | $(Ni—Mn)MoO_4$ | No sample | 180 |
| | $SrMoO_4$ | 460 | No sample |
| | $MgMoO_4$ | >/=1100 | >/=1100 |
| Lamp for comp. purposes | No protective coating | 30 | 110 |

COMPARISON EXAMPLE 2

Next, a test AA was run; besides the fact that the temperature of the electric furnace for heating the lamps was increased, and that the temperature of the seal area of the lamps was 600° C., the conditions were identical to the conditions of test A. The crystalline molybdate protective coating used in test AA consisted solely of $MgMoO_4$.

As Table 3 shows, in the lamp for comparison purposes without a protective coating of crystalline molybdate, after 20 hours cracks formed in the seal area. It becomes apparent that, on the other hand, in the lamp of the invention with a protective coating of crystalline molybdate, the time until crack formation is at least 600 hours, so that, as compared to the lamp for comparison purposes without a protective coating, it is longer, and prolongation of the service life was achieved also with respect to the condition under which the seal area is exposed to a high temperature. Specifically, the oxidation of the molybdenum metal foil which is installed in the seal area and of the molybdenum outer lead can be prevented most advantageously, and various applications can be imagined with respect to lamp construction.

TABLE 3

| Type of Lamp | Type of protective coating | Test AA Time until cracks form (hours) |
|---|---|---|
| Lamp as claimed in the invention | $MgMoO_4$ | Greater/equal to 600 |
| Lamp for comp. purposes | No protective coating | 20 |

COMPARISON EXAMPLE 3

Next, in the halogen lamp of the single end type which is shown in FIG. 10 and in which there is a seal area only on one end, a test C was run in which foil seal lamps with rated values of 100 V and 650 W were operated without interruption within a heater in a vertical orientation with a temperature of the seal area of 511° C. and the time until crack formation in the seal area was studied. The results are shown in Table 4. In this test C, in the lamp for comparison purposes without a protective coating of crystalline molybdate, after 80 hours cracks formed in the seal area. On the other hand, in the lamps in accordance with the invention with a protective coating of crystalline molybdate, in the case of a protective coating of $MnMoO_4$, after 280 hours cracks formed, while in the case of a protective coating of $MgMoO_4$ no cracks formed until after at least 600 hours. In the lamp with the protective coating of $MgMoO_4$, the lamp was not damaged by the cracks, but for another reason, i.e., by sagging of the coil. This means that it becomes apparent that the time until crack formation is longer compared to the lamp for comparison purposes, and that the service life is prolonged.

TABLE 4

| Type of Lamp | Type of protective coating | Test C Time until cracks form (hours) |
|---|---|---|
| Lamp as claimed in the invention | $MnMoO_4$ | 280 |
| | $MgMoO_4$ | Greater/equal to 600 |
| Lamp for comp. Purposes | No protective coating | 80 |

COMPARISON EXAMPLE 4

In the experimental example carried out next, using a lamp in which an outer lead was used with the entire surface electrolytically polished with a surface roughness of roughly 0.5 μm, and using a lamp for which an outer lead was used with a surface which had not been worked for roughness, the time until formation of cracks in the seal areas of the lamps was observed, in which all the outer leads were provided with protective coatings of crystalline molybdate. The two lamps are lamps being in accordance with the invention.

The lamps used for the service life testing are tungsten halogen lamps of the single end type with a seal area on only one end, as shown in FIG. 10. They have rated values from 115 V and 600 W.

In these lamps, the smallest distance between the foils is 2 mm. These lamps therefore belong to a type of lamp with a relatively small distance between the foils. Lamps were chosen in which cracks often form prematurely in the silica glass. When an aqueous $Mg(NO_3)_2$ solution as the sealant for forming the protective coatings was allowed to drip into the cavity which is present on the outer end face of the seal area, the sealant for forming the protective coating penetrated the cavity between the silica glass and the molybdenum outer lead and reached the outer end of the molybdenum metal foil.

The cavity was filled with this sealant for formation of the protective coatings. Furthermore, the sealant for forming the protective coatings was also applied to the outer lead which projects from the seal area. These lamps were placed in an electric furnace and dried. The lamps were heat treated after drying in an electric furnace in order to form a protective coating of crystalline molybdate on the surfaces of the molybdenum metal foil and of the molybdenum outer lead in the seal area.

For service life testing of these lamps they were placed in an electric furnace and the time until crack formation in the seal areas was observed.

Test D and Test DD are tests which are carried out as follows with the processes described below repeated.

The lamps are placed in an electric furnace such that the temperature of the seal area of the lamp reaches 500° C. and 550° C. for 24 hours without interruption;

Afterwards, the lamps are removed from the electric furnace and observed for 30 minutes; and Then, the lamps are returned to the electric furnace and heated for 24 hours without interruption.

The results are shown in Table 5. As is shown in Table 5, at a temperature within the furnace of 500° C. in test D, for the lamp with an outer lead which was not electrolytically polished beforehand, after 400 hours cracks formed in the seal area, while in the lamp with an outer lead which was electrolytically polished beforehand, no cracks formed in the seal area for up to 930 hours, i.e., a time which is at least twice as long as for the lamps with unpolished outer leads.

At a temperature within the furnace of 550° C. in test DD, in the lamp with an outer lead which was not electrolytically polished beforehand, after 48 hours cracks formed in the seal area, while in the lamp with an outer lead which was electrolytically polished beforehand, no cracks formed in the seal area for up to 200 hours, i.e., a time which is at least four times longer than the time for the lamps with unpolished outer leads. That is, when the outer lead is electrolytically polished beforehand, the thickness of the protective coating of the crystalline molybdate is increased and oxidation of the outer lead can be advantageously prevented. In no lamp did the outer lead become thin (not shown in Table 5).

TABLE 5

| Presence or absence of electrolytic polishing of outer lead | Type of protective coating | Test D Time until cracks form (hours) | Test DD Time until cracks form (hours) |
|---|---|---|---|
| Not present | $MgMoO_4$ | 400 | 48 |
| Present (surface roughness 0.50 μm) | $MgMoO_4$ | 930 | 200 |

COMPARISON EXAMPLE 5

Next, test E was run. Foil seal lamps of the single end type with a seal area on one side with rated values of 110 V and 600 W were operated vertically. Using a lamp in which an outer lead was used which was not electrolytically polished beforehand, and using a lamp in which the entire surface of the outer lead was electrolytically polished beforehand with a surface roughness of 0.50 μm, in the respective lamp, by the same process as in the above described test 4, in the same area, a protective coating of crystalline molybdate was formed, in the state in which the periphery of the respective lamp is wound with a heater, and in which the lamp is heated such that the temperature of the seal area is 500° C., uninterrupted operation was carried out and the time until formation of cracks in the seal area was studied. The two lamps were lamps as claimed in the invention.

The result is shown using Table 6. In this test, in a lamp using an outer lead which was not electrolytically polished beforehand, cracks formed in the seal area after 64.5 hours. On the other hand, in the lamp with an outer lead which had been electrolytically polished beforehand, at least 400 hours no cracks formed. This indicates that, in the lamp with an outer lead which had been electrolytically polished, the time up to crack formation is longer than in the lamp without electrolytic polishing of the outer lead, and that in the former lamp a prolongation of the service life is achieved.

TABLE 6

| Presence or absence of electrolytic polishing of outer lead | Type of protective coating | Test E Time until cracks form (hours) |
|---|---|---|
| Not present | $MgMoO_4$ | 64.5 |
| Present (surface roughness 0.50 μm) | $MgMoO_4$ | Greater than or equal to 550 |

Action of the Invention

As was described above, in the foil seal lamp in accordance with the invention, on the surface of the molybdenum metal foil in the seal area and on the surface of the molybdenum outer lead protective coatings of crystalline molybdate are formed. Therefore, when a high temperature of the seal area is reached, oxidation of the metal foil and of the outer lead is prevented with certainty, and thus, a foil seal lamp with a long service life is obtained without cracks forming in the seal area.

Furthermore, since the surface of the outer lead is electrolytically polished such that it becomes rough, a large amount of sealant for forming the protective coatings is carried, and the crystalline molybdate is formed in a great thickness on the surface of the outer lead. As a result, the heat resistance and the anti-oxidation property of the outer lead is increased, and the service life of the outer lead is increased and the service life of the seal area can be prolonged with certainty.

Additionally, because the protective coating of crystalline molybdate is also formed in the area in which the outer lead projects from the seal area, this area is not oxidized even if the outer lead reaches a high temperature of at least 500° C. during operation and is exposed to the outside air. It does not becomes thin either. The temperature of the outer lead of the area which projects from the seal area therefore does not increase. The temperature of the outer lead and the metal foil which are installed in the seal area therefore does not increase, and their oxidation is prevented. Therefore damage to the seal area can be prevented with certainty and a foil seal lamp with a long service life can be obtained.

What is claimed is:

1. Foil seal lamp in which an end of a glass bulb is provided with a seal area, and which comprises:

a metal foil of molybdenum which is placed in the seal area, and a molybdenum outer lead, which has a first end connected to the metal foil and a second end that extend out of the bulb, wherein a protective coating having crystalline molybdate as its primary material is provided on the surfaces of both the metal foil and the outer lead in the seal area.

2. Foil seal lamp as claimed in claim 1, wherein the surface of the outer lead in the seal areas is rough.

3. Foil seal lamp as claimed in claim 1, wherein a protective coating of crystalline molybdate is also provided on an area of the outer lead which projects from the seal area.

4. Foil seal lamp as claimed in claim 3, wherein at least the area of the outer lead which projects from the seal area is rough.

5. Foil seal lamp as claimed in claim 4, wherein the surface roughness is from 0.20 to 0.51 μm.

6. Foil seal lamp as claimed in claim 2, wherein the surface roughness is from 0.20 to 0.51 μm.

7. Foil seal lamp as claimed in claim 1, wherein the molybdate primary material of the protective coating has one of a wolframite or a scheelite crystal structure.

8. Foil seal lamp as claimed in claim 1, wherein an element in addition to oxygen and molybdenum of the crystalline molybdate is selected from at least one of the elements of the group consisting of magnesium, calcium, strontium, barium, manganese, cobalt, nickel, titanium, scandium, yttrium, lanthanum, cerium, praseodymium, neodymium, samarium, europium, gadolinium, terbium, dysprosium, holmium, erbium, thulium, ytterbium, and lutetium.

9. Foil seal lamp as claimed in claim 8, wherein the protective coating primarily consists of one of the molybdates $MnMoO_4$, $MgMoO_4$, $SrMoO_4$, and $(Ni—Mn)MoO_4$.

10. Foil seal lamp as claimed in claim 1, wherein said protective coating has a ratio of an x-ray diffraction intensity ratio of the crystalline molybdate to the ratio of the x-ray diffraction intensity of the other produced compounds that is at least 50%.

* * * * *